UNITED STATES PATENT OFFICE.

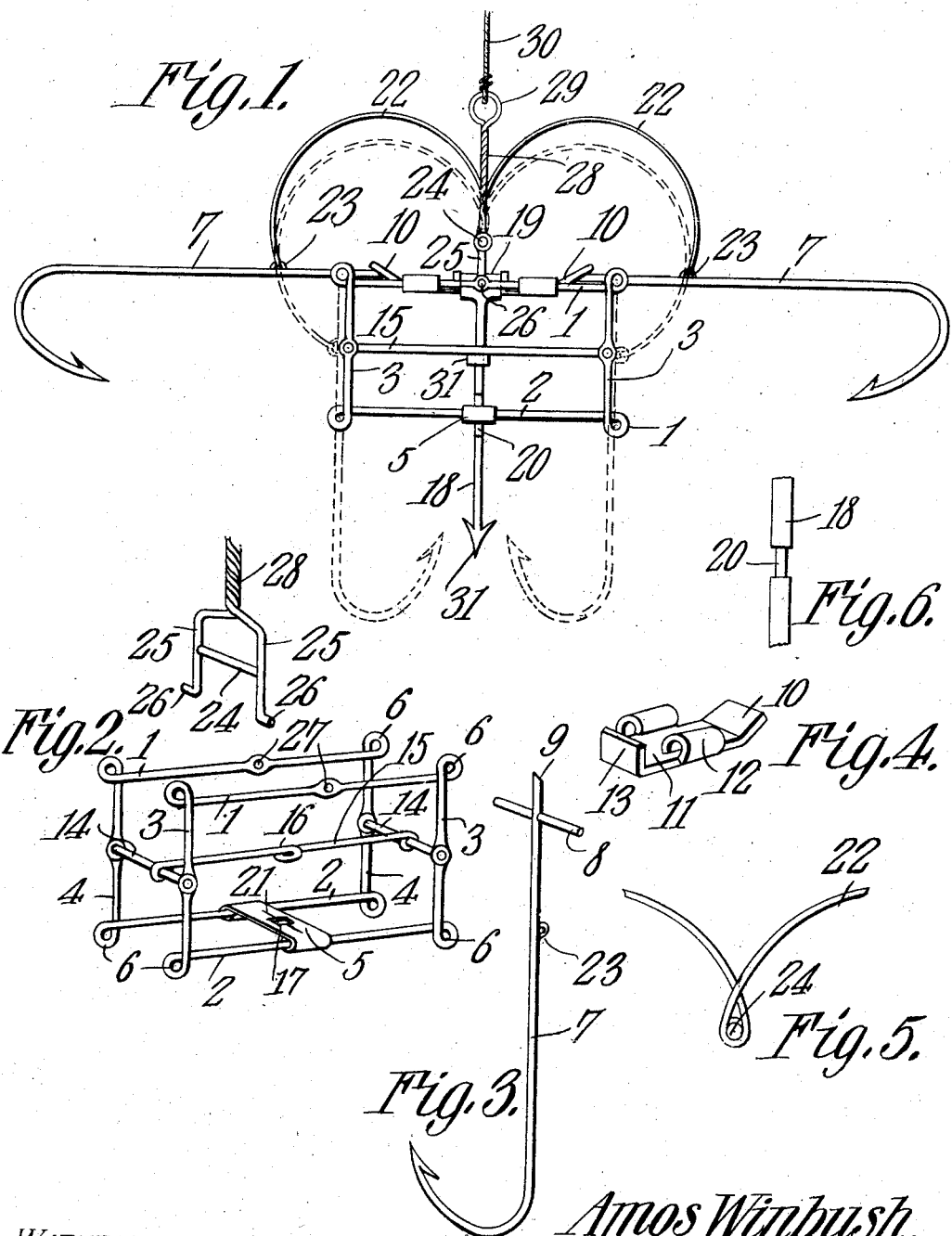

AMOS WINBUSH, OF RUSTON, LOUISIANA, ASSIGNOR OF ONE-HALF TO ANDERSON W. WILEY, OF VERNON, LOUISIANA.

FISH TRAP-HOOK.

No. 866,174.     Specification of Letters Patent.     Patented Sept. 17, 1907.

Application filed June 1, 1907. Serial No. 376,756.

*To all whom it may concern:*

Be it known that I, AMOS WINBUSH, a citizen of the United States, residing at Ruston, in the parish of Lincoln and State of Louisiana, have invented a new and useful Fish Trap-Hook, of which the following is a specification.

This invention relates to fish trap-hooks.

The object of the invention is to provide a hook of the above character that shall be simple of construction, efficient, certain and durable in use, and in which the setting of the striking hooks may be effected without danger of injury to the user.

With the above and other objects in view, as will appear as the nature of the invention is better understood, the same consists in the novel construction and combination of parts of a fish trap-hook as will be hereinafter fully described and claimed.

In the accompanying drawings forming a part of this specification and in which like characters of reference indicate corresponding parts,—Figure 1 is a view in elevation of a fish hook embodying the features of the present invention, its set position being indicated by full lines and its tripped position in dotted lines. Fig. 2 is a perspective detail view of a portion of the fish hook. Fig. 3 is a similar view of one of the striking hooks. Fig. 4 is a perspective detail view of one of the sears used for holding one of the striking hooks in set position. Fig. 5 is a detail view of a portion of the striking hook actuating spring, showing more particularly the manner in which it is held in operative position relatively to the other parts of the device. Fig. 6 is an elevation of a portion of the shank of the bait or trigger-hook.

The hook comprises in part a frame, shown in detail in Fig. 2, which may be made of any suitable material, and is herein shown as constructed of wire, although this is not essential. As displayed, the frame comprises two rectangular members each composed of two parallel side members 1 and 2, and two parallel end members 3 and 4. The ends of the side members 2 are held assembled in alinement, and against movement by a guide 5 that is composed of a strip of metal bent around the members and soldered or otherwise secured thereto. As shown, the frame members are provided with corner eyes 6, but these are not essential as the members may be bent at right angles at these points if desired.

Engaging the two sets of eyes at the terminals of the members 1 are the striking hooks 7, each being provided adjacent to its head or unbarbed end with a cross-bar or shaft 8 that engages the eyes, as shown in Fig. 1. The unbarbed end or head of each hook is beveled at 9, and is designed to be engaged by a pair of sears 10 that are mounted for sliding movement upon the bars 1, the hook-engaging portion of the sears being disposed at an angle to the bars in order, by coaction of the beveled ends of the hooks, to cause the latter, when the sears are released by mechanism presently to be described, automatically to shift the sears out of engagement therewith and thus permit the hooks to assume the position shown in dotted lines in Fig. 1. As shown in Fig. 4 each sear consists of a body portion 11, a hook-engaging member 10, a pair of ears 12 to engage with the frame members 1, and an abutment 13.

The two frames are connected by cross bars 14 that enter openings in the members 3 and 4 intermediate of their ends, and are secured therein either by soldering or by being riveted, as may be preferred. Secured to the cross bars 14 is a guide bar 15, the intermediate portion of which is provided with an orifice 16 disposed in alinement with an orifice 17 in the guide 5, and these two orifices are engaged by the shank 18 of a bait or trigger-hook, the upper end of which is provided with a head 19 that is adapted to engage with the abutments 13 to hold the striking hooks set, or in the position shown in Fig. 1. The intermediate portion of the shank of the trigger-hook is flattened at 20, and this flattened portion works in the orifice 17, the object of this construction of the shank being to prevent the same from turning so that proper coöperation between the head 19 of the trigger and the abutments 13 will always be assured. In order to assemble the shank with the guide 5, the same is longitudinally slitted at 21 on each side of the orifice 17, and the lips formed by the incision are turned out to permit insertion of the shank after which they are flattened down and occupy the positions shown in Fig. 2.

In order to cause the striking hooks to close with sufficient force to drive the barbs into the head and throat of a fish, a double semi-circular spring 22 is provided, the terminals of which are looped into eyes 23 arranged on the outer sides of the striking hooks and the intermediate portion of which is coiled one or more times around a shaft or bar 24 that is secured to two members 25, the free ends of which are outturned to form pintles 26 that engage orifices 27 in the frame members 1. Above the bar 24 the members are twisted together to form a shank 28, the outer end of which is formed into an eye 29 to be engaged by the line 30.

In baiting the hook the sears are first moved inward toward the members 25, the trigger-hook being moved to cause the head 19 to be out of the path of movement of the sears. The hooks 7 are then moved to the position shown in full lines in Fig. 1, and the sears moved outward to cause the members 10 to engage with the beveled terminals 9 of the hook, and the trigger hook is then moved to bring the head between the abutments 13, the upward and downward movements of the trigger hook being controlled by a stop 31 rigid with the shank and adapted to engage, respectively, with the guide 5 and the guide-bar 15. After the parts are in the position described a suitable bait is secured to the barbed end 32 of the trigger hook. Should a fish take the bait a downward draft applied to the trigger-hook will cause the head 19 to be moved from out of engagement with the abutments, whereupon the springs 22 will exert their pressure causing the beveled ends 9 of the hook by contact with the sears 10 to shift the latter laterally, whereupon the hooks will be free to spring to the position shown in dotted lines in Fig. 1 and thereby firmly impale the fish.

Having thus described the invention, what is claimed is:—

1. A fish hook comprising a frame, striking hooks carried thereby, sears movable on the frame to engage the hooks, and a bait hook having a head to engage portions of the sears.

2. A fish hook comprising a frame, striking hooks pivotally connected therewith, sears movable on the frame and having bevel members to engage with the heads of the hooks, and a bait hook having a head to engage portions of the sears.

3. A fish hook comprising a frame, striking hooks pivotally connected therewith and provided with heads, sears movable longitudinally on the frame to engage the said heads, a bait hook coacting with the sears, and means for guiding the latter hook relatively to the sears.

In testimony that I claim the foregoing as my own, I have hereto affixed my signature in the presence of two witnesses.

AMOS WINBUSH.

Witnesses:
C. C. THURMAN,
SAVERY M. LEWIS.